(12) United States Patent
Li

(10) Patent No.: US 9,370,032 B2
(45) Date of Patent: Jun. 14, 2016

(54) SERVICE PROCESSING METHOD AND APPARATUS BASED ON ANDROID SYSTEM

(75) Inventor: Jiyou Li, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 33 days.

(21) Appl. No.: 13/608,797

(22) Filed: Sep. 10, 2012

(65) Prior Publication Data

US 2013/0005320 A1 Jan. 3, 2013

Related U.S. Application Data

(63) Continuation of application No. PCT/CN2011/071668, filed on Mar. 10, 2011.

(30) Foreign Application Priority Data

Mar. 10, 2010 (CN) .............................. 201010123923

(51) Int. Cl.
*G06F 15/16* (2006.01)
*H04L 12/28* (2006.01)
(Continued)

(52) U.S. Cl.
CPC .............. *H04W 76/022* (2013.01); *H04W 4/00* (2013.01); *H04W 76/028* (2013.01); *H04W 76/06* (2013.01)

(58) Field of Classification Search
CPC .............. H04L 29/06; H04L 29/08072; H04L 29/08576; H04L 29/0809; H04L 29/06537; H04W 84/12; H04W 84/18; H04W 80/04; H04W 8/26; H04W 88/06
USPC .......................................... 370/338; 709/228
See application file for complete search history.

(56) References Cited

U.S. PATENT DOCUMENTS 6,847,610 B1   1/2005  Suumaeki et al.
2002/0147824 A1  10/2002  Hurtta et al.
(Continued)

FOREIGN PATENT DOCUMENTS

CN    101466099 A    6/2009
CN    101472273 A    7/2009
(Continued)

OTHER PUBLICATIONS

Office Action issued in corresponding Chinese Patent Application No. 201010123923.8, mailed Jan. 5, 2012.
(Continued)

*Primary Examiner* — Emmanuel L Moise
*Assistant Examiner* — Mahran Abu Roumi
(74) *Attorney, Agent, or Firm* — Brinks Gilson & Lione

(57) ABSTRACT

A service processing method and apparatus based on Android system are provided in the embodiments of the present invention. The technical solutions in the embodiments of the present invention enable the Android platform to support more PDPs other than one PDP by creating corresponding PDP based on the service type of a specific service, therefore avoiding the complicated procedure during which when the current Android platform is processing services and one pending service type can not be processed by an active PDP, interrupting the service in the processing and deactivating the current PDP, reestablishing a new PDP to process service and recovering the former PDP after processing the service, and therefore the parallel processing capability for various services in the Android system is achieved and the user experience is greatly improved.

4 Claims, 2 Drawing Sheets

(51) Int. Cl.
*H04W 4/00* (2009.01)
*H04W 76/02* (2009.01)
*H04W 76/06* (2009.01)

(56) References Cited

U.S. PATENT DOCUMENTS

| | | | |
|---|---|---|---|
| 2003/0165222 A1* | 9/2003 | Syrjala | H04M 15/00 379/114.26 |
| 2005/0207336 A1* | 9/2005 | Choi | H04J 13/00 370/208 |
| 2006/0056307 A1* | 3/2006 | Hellgren | H04W 4/26 370/252 |
| 2006/0171306 A1 | 8/2006 | Stout et al. | |
| 2007/0258427 A1* | 11/2007 | Shaheen | H04W 76/022 370/338 |
| 2008/0025290 A1* | 1/2008 | Barkai | H04L 51/22 370/352 |
| 2008/0112407 A1* | 5/2008 | Liu | H04N 1/00106 370/389 |
| 2008/0159194 A1* | 7/2008 | Westman | H04L 12/5692 370/310 |
| 2008/0165751 A1* | 7/2008 | Soininen | H04L 29/06 370/338 |
| 2008/0181220 A1* | 7/2008 | Babbar | H04L 69/16 370/389 |
| 2010/0023628 A1* | 1/2010 | Choi | H04L 29/12952 709/228 |
| 2011/0038322 A1* | 2/2011 | Liang | H04W 76/022 370/328 |
| 2011/0122886 A1* | 5/2011 | Willars | H04L 12/5695 370/412 |
| 2011/0171926 A1* | 7/2011 | Faccin | H04W 48/18 455/404.1 |
| 2013/0005320 A1* | 1/2013 | Li | H04W 76/022 455/418 |

FOREIGN PATENT DOCUMENTS

| | | |
|---|---|---|
| CN | 101572862 A | 11/2009 |
| CN | 101662452 A | 3/2010 |
| CN | 101808270 A | 8/2010 |
| JP | 2003-508987 A | 3/2003 |
| JP | 2004-534438 A | 11/2004 |
| JP | 2009-535980 A | 10/2009 |
| KR | 20040043287 A | 5/2004 |
| KR | 10-2010-0010114 A | 2/2010 |
| WO | WO 2007/130281 A2 | 11/2007 |

OTHER PUBLICATIONS

Extended European Search Report issued in corresponding European Patent Application No. 11752837.2, mailed Mar. 6, 2013.
Wenfeng et al., "Implementation of Multiple PDP Contexts on Android" IEEE 2010.
"Multiple APN Scenarios", Dec. 22, 2008. URL:http://web.archive.org/web/20081222092825/http://msdn.microsoft.com/en-us/library/bb416278.aspx.
"Establishing a WWAN-based GPRS Connection" Dec. 8, 2008. URL:http://web.archive.org/web/20081208101329/http:// msdn.microsoft.com/en-us/library/bb416428.aspx.
"Roadmap" Oct. 22, 2008. URL:http://web.archive.org/web/20081022192213/http://source.android.com/roadmap.
Office Action issued in corresponding Chinese Patent Application No. 201010123923.8; mailed Jul. 11, 2012.
International Search Report issued in corresponding PCT Application No. PCT/CN2011/071668; mailed Jun. 9, 2011.
Written Opinion of the International Searching Authority issued in corresponding PCT Patent Application No. PCT/CN2011/071668, mailed Jun. 9, 2011.

* cited by examiner

SERVICE PROCESSING METHOD AND APPARATUS BASED ON ANDROID SYSTEM

CROSS-REFERENCE TO RELATED APPLICATIONS

This application is a continuation of International Application No. PCT/CN2011/071668, filed on Mar. 10, 2011, which claims priority to Chinese Patent Application No. 201010123923.8, filed on Mar. 10, 2010, both of which are hereby incorporated by reference in their entireties.

FIELD OF THE INVENTION

The present invention relates to the field of communication technology, and particularly, to a service processing method and apparatus based on Android system.

BACKGROUND OF THE INVENTION

The Android system is a new generation of smart mobile terminal system. In more and more mobile terminals, the Android system is used as an operation system, and the users of the mobile terminals adopting the Android system also increasingly grow. The mobile terminal with the Android system provides strong network functions, and the users can Access Internet very conveniently.

There are two basic concepts in the Android system need to be introduced firstly, one is APN, and the other is PDP. Wherein:

Access Point Name (APN): the logical name of one Gateway GPRS Support Node (GGSN) and the external network; corresponding APN configuration is required when a PDP is activated.

Packet Data Protocol (PDP): an interaction channel between a mobile terminal and the network; one PDP enables the mobile terminal to own an IP address, and it is corresponding to one network interface in the mobile terminal.

Through studies the inventor finds that currently, the mobile terminal adopting the Android system does not support usage of multiple APNs simultaneously while performing the network related services. That is to say, at one timing, in the mobile terminal adopting the Android system there are only one APN in the being used state, and correspondingly, there is just one PDP exists in the mobile terminal adopting the Android system. In case that the APN existed in the mobile terminal with the Android system is an APN for a dedicated service, e.g. an APN specialized for the Internet service, and corresponding PDP can only process the Internet service. When the mobile terminal being processing the Internet service receives a request for processing the Multimedia Messaging Service (MMS), a processing method on the current Android system firstly deactivates a PDP presently in the activated state and being processing the Internet service, then activates a PDP capable of processing the MMS according to the configuration of the APN capable of processing the MMS, and recovers the former PDP for processing the Internet service after the processing of the MMS is ended. It is clear that in the current Android system, when a PDP corresponding to a dedicated APN is processing a service, if a request for processing a different type of service is received, the processing of the current service shall be interrupted to process the new service, which greatly influences the processing of the original service, reduces the processing speed of the mobile terminal, and decreases the user experience.

SUMMARY OF THE INVENTION

In view of the above problem, the embodiments of the present invention provide a service processing method and apparatus based on Android system to fundamentally change the service processing flow of the current Android system, and ensure the normal proceeding of the current service while processing a new service, thereby increasing processing speed of the mobile terminal, and improving the user experience.

In order to achieve the above object, the embodiments of the present invention provide the following technical solutions:

A service processing method based on Android system, comprising:

determining the service type of a first service when a first service request is received judging whether a Packet Data Protocol (PDP) currently in the activated state can process the first service according to the service type of the first service;

creating a first PDP according to the service type of the first service when the PDP currently in the activated state cannot process the first service; and notifying an application corresponding to the first service that the first PDP is activated and to process the first service through the first PDP.

A service processing apparatus based on Android system, comprising:

a determining unit, configured to determine the service type of a first service when a first service request is received;

a judging unit, configured to judge whether a Packet Data Protocol (PDP) currently in the activated state can process the first service according to the service type of the first service;

a first processing unit, configured to create a first PDP according to the service type of the first service when the PDP currently in the activated state cannot process the first service; and a notifying unit, configured to notify an application corresponding to the first service to process the first service through the first PDP.

It can be seen that the solutions provided by the embodiments of the present invention can create corresponding PDP based on the service type of a specific service, so that the Android platform supports more PDPs other than one PDP, therefore fundamentally avoiding the complicated procedure of, when the current Android system is processing services and one pending service type can not be processed by a PDP in the activated state, interrupting the service in the processing, deactivating the current PDP, re-creating a new PDP to process service and recovering the former PDP after completing the service processing, thus the capability of parallel processing of various types of services in the Android system is achieved and the user experience is also greatly improved.

BRIEF DESCRIPTION OF THE DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying a creative effort.

DETAILED DESCRIPTION OF THE PREFERRED EMBODIMENTS

In order that a person skilled in the art better understands the technical solutions in the present invention, the technical solutions of the embodiments of the present invention will be clearly and completely described as follows with reference to the drawings of the embodiments of the present invention. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Embodiment 1

Figure 1:
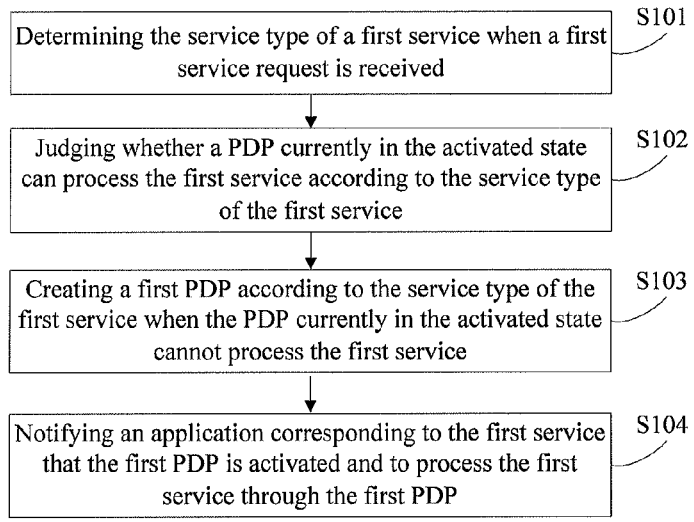
FIG. 1 is a flowchart of a method provided by Embodiment 1 of the present invention.

Referring to FIG. 1, a service processing method based on Android system provided by Embodiment 1 of the present invention comprises:

S101: determining the service type of a first service when a first service request is received.

In the embodiment of the present invention, the first service is used to describe any service in the current Android system, and the first service request is used to describe the service request corresponding to any service to be executed.

In the Android system, each service has corresponding service type. Take the network related services as an example, for example, browsing a webpage or viewing videos on a webpage belongs to the Internet service, while receiving or sending a multimedia message belongs to the multimedia message service. In the Android system, the service type of the Internet service is default, and the service type of the multimedia message service is MMS.

S102: judging whether a PDP currently in the activated state can process the first service according to the service type of the first service.

S103: creating a first PDP according to the service type of the first service when the PDP currently in the activated state cannot process the first service.

In the embodiment of the present invention, the newly created PDP is described as the first PDP.

Further, creating the first PDP according to the service type of the first service comprises:

determining corresponding first APN according to the service type of the first service; and activating corresponding first PDP according to the configuration of the first APN.

One PDP context represents an interaction channel between a mobile terminal and the network. One PDP context enables the mobile terminal to own an IP address, and it is corresponding to one network interface in the mobile terminal. The PDP is activated according to the configuration of the APN. The service type that can be processed by the PDP is determined by the configuration of the APN. The configuration of the APN includes APN, proxy, port, user name, password, APN type, etc. In which, the APN is a name of the APN; the proxy and port are gateway address and port number; when an APN is configured with the proxy and port, applications shall interact with a server through the configured proxy and port, rather than directly interacting with the server; the user name and the password are used for an authentication when a PDP is activated using the APN; if the user name and the password are not matched with each other, the APN cannot activate the PDP successfully; the APN type represents a service type that can be processed by the PDP activated by the APN; for example, when the APN type is * or empty, it means that the PDP activated by the APN can process any type of service; when the APN type is MMS, it means that the PDP activated by the APN can process the MMS; when the APN type is default, it means that the PDP activated by the APN can process services other than the MMS, such as Internet related services.

For example, in the current mobile terminal, when the APN type corresponding to the activated PDP is default, it is determined according to the service type of the MMS that the PDP currently in the activated state cannot process the first service in case the first service is the MMS, and the first PDP shall be activated according to the service type of the first service.

S104: notifying an application corresponding to the first service that the first PDP is activated and to process the first service through the first PDP.

After being created, the first PDP can be used to process such type of services.

Currently, the network side server supports a mobile terminal to have multiple PDPs in the activated state simultaneously. In that case, the mobile terminal may own multiple IP addresses corresponding to multiple network interfaces, when there are multiple PDPs in the activated state simultaneously in the mobile terminal.

In practical applications, when it is determined according to the service type of the first service that the PDP currently in the activated state can process the first service, corresponding PDP in the activated state is used to process the first service.

For example, the PDP currently in the activated state is configured by corresponding APN to process services of default type, and the first service requested by the first service request is a service of viewing videos through the webpage. Such service belongs to the type of default and can be directly processed by the PDP currently in the activated state, without needing to create a new PDP.

The method provided by Embodiment 1 of the present invention can create corresponding PDP based on the service type of a specific service, so that the Android platform supports more PDPs other than one PDP, therefore fundamentally avoiding the complicated procedure of, when the current Android platform is processing services and one pending service type can not be processed by a PDP in the activated state, interrupting the service in the processing, deactivating the current PDP, re-creating a new PDP to performing service processing and recovering the former PDP after completing the service processing, thus the capability of parallel processing of various types of services in the Android system is achieved and the user experience is greatly improved.

In addition, in Embodiment 1 of the present invention, the method as illustrated in FIG. 1 can be implemented by a DataConnectionTracker in the Framework of the Android system.

Embodiment 2

Figure 2:
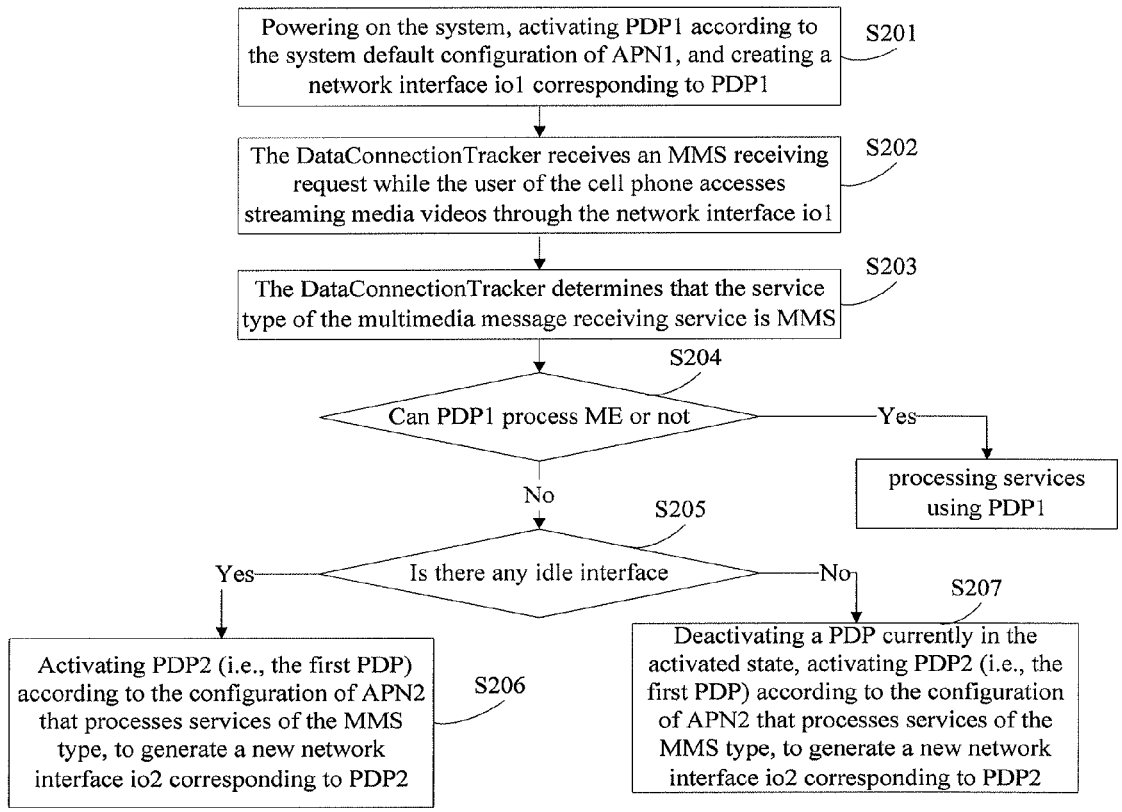
FIG. 2 is a flowchart of a method provided by Embodiment 2 of the present invention.

Referring to FIG. 2, a process for a cell phone adopting the Android system to process services using the method provided by Embodiment 1 of the present invention specifically comprises:

S201: powering on the system, activating PDP1 according to the configuration of the system default APN1, and creating a network interface io1 corresponding to PDP1.

The system is the Android system in the cell phone. In the embodiment of the present invention, the APN type of APN1 is default, and service types other than MMS all can be processed by PDP1.

S202: the DataConnectionTracker receives an MMS receiving request while the user of the cell phone accesses streaming media videos through the network interface io1.

S203: the DataConnectionTracker determines that the service type of the multimedia message receiving service is MMS.

S204: the DataConnectionTracker judges whether PDP1 can process the service of the MMS type; if yes, processing the service using PDP1, otherwise proceeding to step S205.

In the embodiment of the present invention, PDP1 can process the service types other than MMS, thus the flow shall proceed to step S205.

S205: the DataConnectionTracker judges whether the current system has any idle network interface; if yes, proceeding to step S206, otherwise proceeding to step S207.

S206: activating PDP2 (i.e., the first PDP) according to the configuration of APN2 that processes services of the MMS type, to generate a new network interface io2 corresponding to PDP2.

S207: deactivating a PDP in the activated state, activating PDP2 (i.e., the first PDP) according to the configuration of APN2 that processes services of the MMS type, to generate a new network interface io2 corresponding to PDP2.

Each PDP in the activated state is corresponding to a network interface. If the network interfaces of the system are all in the being used state, there is no available network interface even a new PDP is activated, and thus the system cannot transmit the service data through the activated PDP. Thus in practical application, when a new PDP is to be activated, it shall be determined whether there is any idle network interface at present, and if yes, directly proceeding to step S206 to activate PDP2 according to the configuration of APN. However, if there is no network interface available at present, it is needed to deactivate a PDP currently in the activated state to release a network interface, then activating PDP2 according to the configuration of APN2, so as to transmit the service data of PDP2 using the released network interface, as illustrated in step S207.

In the embodiment of the present invention, when the currently activated PDPs include a PDP with an APN type of default, the PDP is directly deactivated, otherwise a PDP shall be selected for deactivation according to the predetermined priority level of the APN type. Once a PDP is deactivated, PDP2 required for processing the multimedia message can be activated, and the application is notified that PDP2 is activated.

Of course, in order not to influence the normal service processing flows of the existing PDPs in the activated state, any new PDP may not be activated and the application may be directly notified that the PDP activation is failed, if the currently activated PDPs have no PDP with the APN type of default.

In practical application, in order to ensure that the service data of corresponding service type can be transmitted through the first PDP, a connection channel between the first PDP and corresponding service type shall be established, so that the service data of such type can be transmitted through the first PDP.

Figure 3:
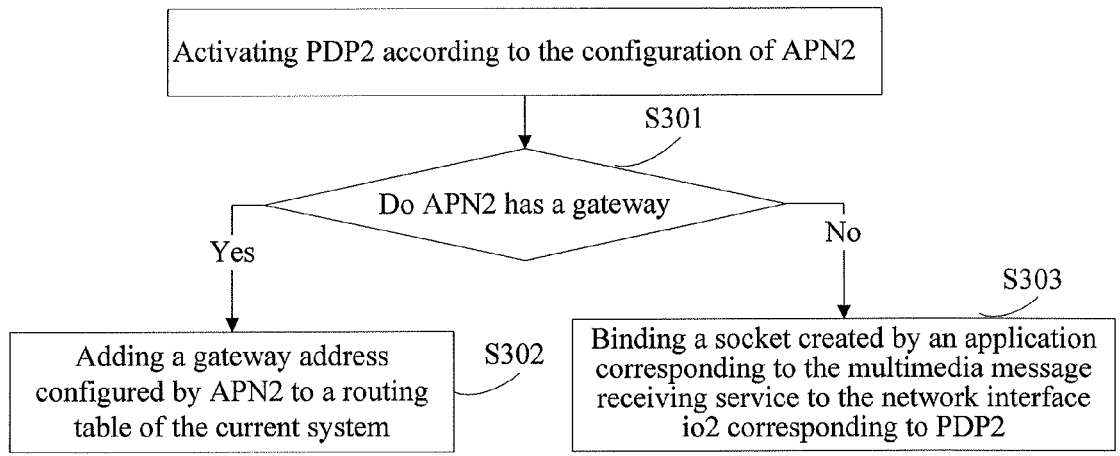
FIG. 3 is a flowchart of a process in the method provided by Embodiment 2 of the present invention.

Referring to FIG. 3, which continues the embodiment as illustrated in FIG. 2. After PDP2 is activated according to the configuration of APN2, establishing a connection channel between PDP2 and corresponding service type comprises:

S301: judging whether APN2 has a gateway; if yes, proceeding to step S302, otherwise proceeding to step S303.

S302: adding the gateway address configured by APN2 to the routing table of the current system.

To be noted, in the Android system, when a new PDP (i.e., PDP2) is activated, a default routing item will be automatically added to the routing table by the system. In order to ensure the normal proceeding of the original service, it is necessary to delete the default routing item automatically added to the routing table by the system.

S303: binding a socket created by an application corresponding to the multimedia message receiving service to the network interface io2 corresponding to PDP2.

As can be seen from the embodiment as illustrated in FIG. 3, for the APN having a gateway and the APN having no gateway, the method provided by the embodiment of the present invention employs different ways to establish a connection channel between the PDP configured by the APN and corresponding service type. For the APN having a gateway, the processing is simple, and the data whose destination address is the gateway can be routed to the PDP configured by the APN just by adding the gateway address configured by the APN to the routing table of the current system. That is, in the embodiment as illustrated in FIG. 3, the data whose destination address is the gateway configured by APN2 can be routed to PDP2.

For the APN having no gateway, the adopted processing method is to establish connections between the applications of the service types processed by the APN and the first PDP configured by the APN, respectively. Specifically, the socket created by corresponding application is bound to the network interface corresponding to the first PDP. In the embodiment as illustrated in FIG. 3, the socket created by the application corresponding to the multimedia message receiving service is bound to the network interface io2 corresponding to PDP2.

In case APN2 corresponds to multiple applications, the sockets created by these applications shall be bound to io2, respectively.

In practical application, the socket created by the application may be bound to the network interface corresponding to the PAP through a function setsockopt( ) of the Android system.

The method provided by the present invention judges whether the PDP currently in the activated state has the processing capability according to the service type to be processed, and if not, activates a new PDP to process the service to be processed according to the configuration of the APN corresponding to the service type to be processed, rather than interrupting the service currently being processed to process the service to be processed. In addition, after the new PDP is obtained, the method provided by the embodiment of the present invention further establishes a connection between corresponding application and the new PDP, thereby further ensuring the transmission of corresponding service data.

Embodiment 3

Figure 4:
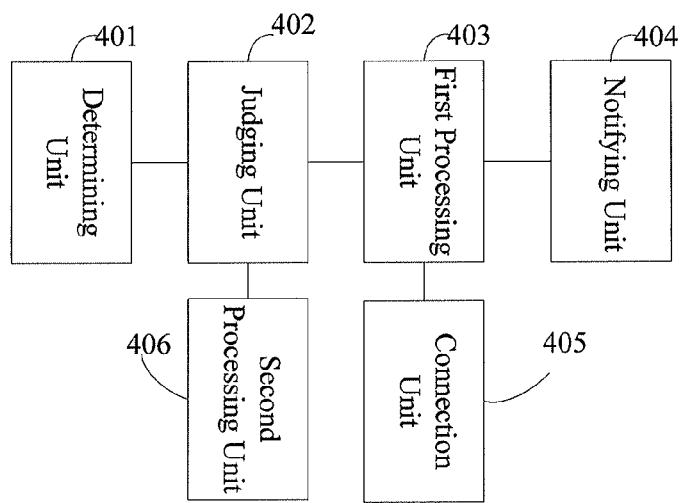
FIG. 4 is a structure diagram of an apparatus provided by Embodiment 3 of the present invention.

Referring to FIG. 4, Embodiment 3 of the present invention provides a service processing apparatus based on Android system, comprising:

a determining unit 401 configured to determine the service type of a first service when a first service request is received;

a judging unit 402 configured to judge whether a PDP currently in the activated state can process the first service according to the service type of the first service;

a first processing unit 403 configured to create a first PDP according to the service type of the first service when the PDP currently in the activated state cannot process the first service;

wherein the first processing unit 403 firstly determines corresponding first APN according to the service type of the first service, then activates corresponding first PDP according to the configuration of the first APN;

a notifying unit 404 configured to notify an application corresponding to the first service to process the first service through the first PDP.

The apparatus provided by the embodiment of the present invention can create corresponding PDP based on the service type of a specific service, so that the Android system supports more PDPs other than one PDP, therefore fundamentally avoiding the complicated procedure of, when the current Android platform is processing services and one pending service type can not be processed by a PDP in the activated state, interrupting the service in the processing, deactivating the current PDP, re-creating a new PDP to process service and recovering the former PDP after completing the service processing, thus the capability of parallel processing of various types of services in the Android system is achieved and the user experience is greatly improved.

In another embodiment of the present invention, the apparatus as illustrated in FIG. 4 may further comprise:

a connection unit 405 configured to establish a connection channel between the first PDP and corresponding service type, so that the service data of such type can be transmitted through the first PDP.

Further, the connection unit 405 includes:

a first obtaining sub-unit configured to obtain a gateway address configured by an APN corresponding to the first PDP; and an adding sub-unit configured to add the gateway address to a routing table of the current system.

In another embodiment of the present invention, the connection unit 405 includes:

a second obtaining sub-unit configured to obtain a socket created by an application corresponding to the first service; and a binding sub-unit configured to bind the socket to a network interface corresponding to the first PDP.

Alternatively, in an embodiment of the present invention, the apparatus as illustrated in FIG. 4 further includes:

a second processing unit 406 configured to process the first service using the corresponding PDP currently in the activated state when the PDP in the activated state can process the first service.

The apparatus provided by the present invention judges whether the PDP currently in the activated state has the processing capability according to the service type to be processed, and if not, activates a new PDP to process the service to be processed according to the configuration of the APN corresponding to the service type to be processed, rather than interrupting the service currently being processed to process the service to be processed. In addition, after the new PDP is obtained, the apparatus provided by the embodiment of the present invention further establishes a connection between corresponding application and the new PDP, thereby further ensuring the transmission of corresponding service data.

The present invention can be described in the general context of a computer executable instruction executed by a computer, such as a program module. Generally, the program module includes routine, program, object, component, data structure, etc. that executes a specific task or implements a specific abstract data type. The present invention can also be practiced in distributed computing environments, in which a task is executed by a remote processing device connected through a communication network, and the program module can be located in local and remote computer storage mediums including the storage device.

The above descriptions are just preferred embodiments of the present invention. To be noted, various improvements and modifications can be made by a person skilled in the art without deviating from the principle of the present invention, and those improvements and modifications shall also be deemed as falling within the protection scope of the present invention.

What is claimed is:

1. A method, performed by a mobile terminal, for processing service based on packet data protocol (PDP) by using an Android system, comprising:

determining a service type of a first service when a first service request is received, wherein the service type is one of preset service types including at least a default type and a MMS (Multimedia Messaging Service) type;

judging whether a PDP currently in an activated state can process the first service according to the service type of the first service;

creating a first PDP in the Android system according to the service type of the first service with the PDP currently in the activated state being retained, when the PDP currently in the activated state cannot process the first service, to generate a new network interface corresponding to the first PDP, so that multiple PDPs in the Android system are in activated state simultaneously and multiple network interfaces used for multiple activated PDPs correspond to multiple IP addresses, wherein creating the first PDP according to the service type of the first service with the PDP currently in the activated state being retained, when the PDP currently in the activated state cannot process the first service to generate a new network interface corresponding to the first PDP comprises:

if the Android system has an idle network interface, activating the first PDP according to a configuration of an Access Point Name (APN) that processes the first service, to generate a new network interface corresponding to the first PDP;

if the Android system does not have an idle network interface, deactivating a PDP in the activated state, activating the first PDP according to the configuration of the APN that processes the first service, to generate a new network interface corresponding to the first PDP;

before creating the first PDP according to the service type of the first service with the PDP currently in the activated state being retained, judging whether the Android system has any idle network interface;

establishing a connection channel between the first PDP and corresponding service type, so that the service data of such type can be transmitted through the first PDP;

notifying an application corresponding to the first service that the first PDP is activated to process the first service through the first PDP;

wherein establishing the connection channel between the first PDP and corresponding service type comprises:

adding a gateway address configured by an Access Point Name (APN) corresponding to the first PDP to a routing table of the Android system, if the APN has the gateway; and binding a socket created by the application corresponding to the first service to the generated network interface corresponding to the first PDP, if the APN has no gateway.

2. The method according to claim 1, further comprising:
processing the first service using the corresponding PDP currently in the activated state when the PDP in the activated state can process the first service.

3. A mobile terminal using an Android system, the mobile terminal comprising a processor connected to a computer readable a non-transitory memory, for processing service based on packet data protocol (PDP) by executing a computer readable program stored on the non-transitory memory, wherein the computer readable program, when executed, enables the mobile terminal to:

determine a service type of a first service when a first service request is received, wherein the service type is one of preset service types including at least a default type and a MMS (Multimedia Messaging Service) type;

judge whether a PDP currently in an activated state can process the first service according to the service type of the first service;

create a first PDP in the Android system according to the service type of the first service with the PDP currently in the activated state being retained, when the PDP currently in the activated state cannot process the first service, to generate a new network interface corresponding to the first PDP, so that multiple PDPs in the Android system are in activated state simultaneously and multiple network interfaces used for multiple activated PDPs correspond to multiple IP addresses, wherein creating the first PDP according to the service type of the first service with the PDP currently in the activated state being retained, when the PDP currently in the activated state cannot process the first service to generate the new network interface corresponding to the first PDP comprises: if the Android system has an idle network interface, activating the first PDP according to a configuration of an Access Point Name (APN) that processes the first service, to generate a new network interface corresponding to the first PDP;

if the Android system does not have an idle network interface, deactivating a PDP in the activated state, activating the first PDP according to the configuration of the APN that processes the first service, to generate a new network interface corresponding to the first PDP;

establish a connection channel between the first PDP and corresponding service type, so that the service data of such type can be transmitted through the first PDP; and notify an application corresponding to the first service to process the first service through the first PDP;

wherein establishing the connection channel between the first PDP and corresponding service type comprises:

adding a gateway address configured by an Access Point Name (APN) corresponding to the first PDP to a routing table of the Android system, if the APN has the gateway; and binding a socket created by the application corresponding to the first service to the generated network interface corresponding to the first PDP, if the APN has no gateway, wherein before creating the first PDP according to the service type of the first service with the PDP currently in the activated state being retained, the computer readable program, when executed, enables the mobile terminal further to:

judge whether the Android system has any idle network interface.

4. The mobile terminal according to claim 3, wherein the computer readable program, when is executed, further enables the mobile terminal to:

process the first service using the corresponding PDP currently in the activated state when the PDP in the activated state can process the first service.

* * * * *